United States Patent [19]

Degen

[11] 4,277,935
[45] Jul. 14, 1981

[54] POWER TAKE-OFF DEVICE FOR ROTARY LAWNMOWER

[75] Inventor: John K. Degen, Sydney, Australia

[73] Assignee: June Shirley Degen, Forestville, Australia

[21] Appl. No.: 147,069

[22] Filed: May 6, 1980

[51] Int. Cl.³ ............................................... A01G 3/06
[52] U.S. Cl. .......................................... 56/2; 56/16.9; 56/17.1; 56/256
[58] Field of Search ................... 56/16.9, 13.7, 2, 256, 56/DIG. 4, 17.5, 320.1, 320.2, 17.1

[56] References Cited
U.S. PATENT DOCUMENTS

| | | | |
|---|---|---|---|
| 3,191,368 | 6/1965 | Hidalgo | 56/256 |
| 3,693,334 | 9/1972 | Lowery | 56/16.9 |

Primary Examiner—Jay N. Eskovitz
Attorney, Agent, or Firm—Sandler & Greenblum

[57] ABSTRACT

An accessory for a rotary lawnmower for the trimming of lawn edges and comprising a channelled elongated frame provided with clips near opposite ends for attaching the frame beneath the baseplate of the lawnmower, a drive pulley on the frame having spaced upright posts engageable by a collar secured to the lower end of the lawnmower drive shaft for rotation of said pulley, a housing supported upright from one end of said frame and containing a transfer pulley, a belt drive between said pulleys, a trimmer blade belt driven from the transfer pulley to rotate in a vertical plane, and a canopy for said blade connected to said housing and free to pivot on two axes to provide adjustment of height of cut and angle of cut of said trimmer blade.

11 Claims, 2 Drawing Figures

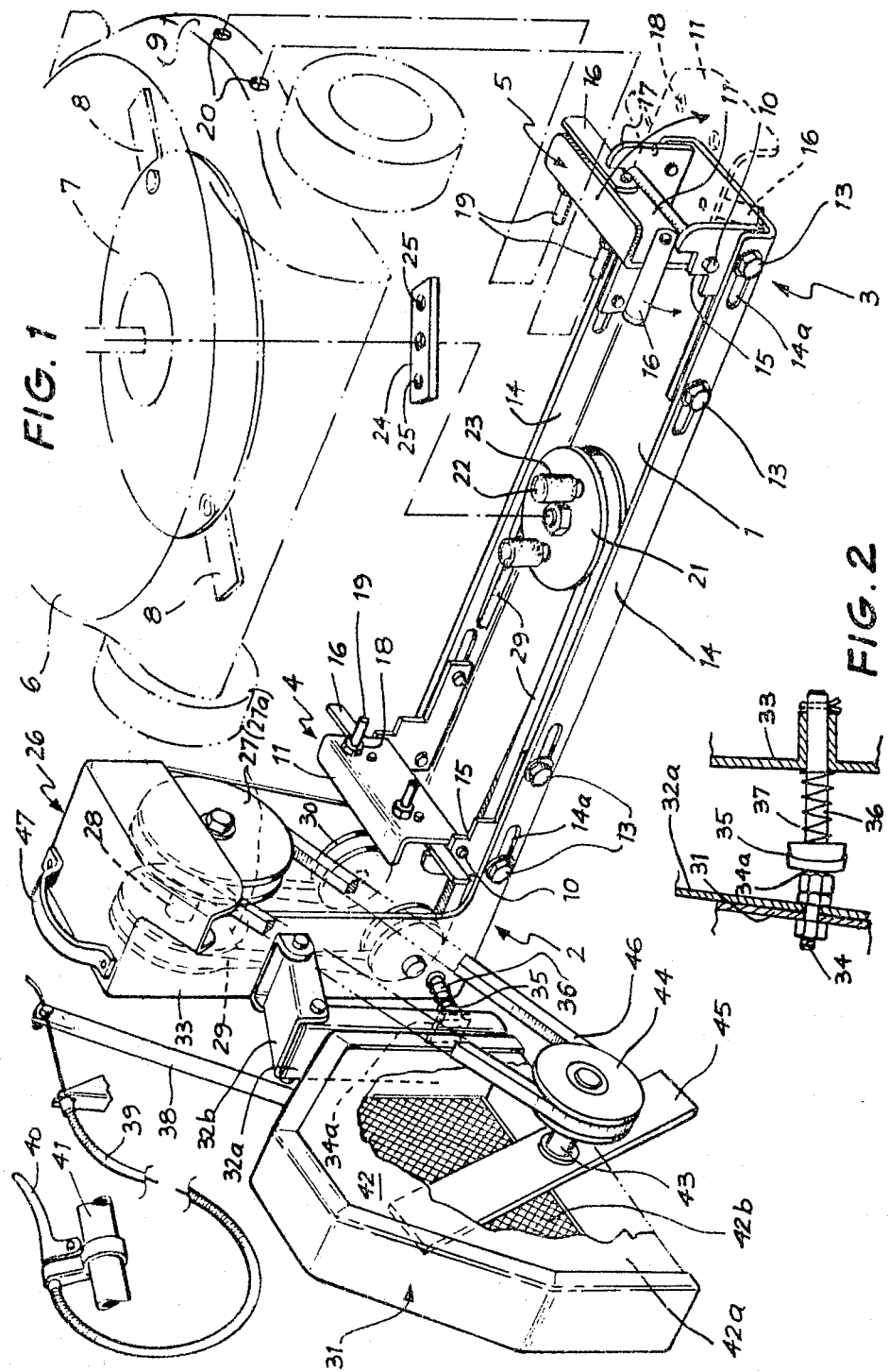

POWER TAKE-OFF DEVICE FOR ROTARY LAWNMOWER

This invention relates to power take-off devices, and more particularly to lawn edge trimming devices which are connectable with a power source only when required.

An adequate source of power is the prime mover on a conventional rotary lawnmower and, as the task of trimming the edges of a lawn is complementary to the cutting of the surface thereof with the use of the lawnmower, that machine will be conveniently on hand. Several attempts have been made to incorporate an edge trimming appliance upon a rotary lawnmower but either this has made the machine cumbersome or has detracted from the safety of the machine under conditions where the trimming appliance is not in actual use. Where trimming appliances have been provided as accessories to lawnmowers they are often inconvenient to attach in that tools are required to be used.

It is the main object of this invention to provide as a readily attachable accessory to a rotary lawnmower an edge trimming appliance which is relatively versatile and safe in use.

The invention in a general form provides a lawn edge trimming appliance in the form of an accessory for a rotary lawnmower which includes a prime mover upon a baseplate surrounding and covering a cutter disc which mounts a plurality of cutting blades, said appliance comprising an elongated metal frame, means for fixing said frame to opposite parts of the periphery of said baseplate so that said frame is disposed on the diameter thereof, an upright housing upon an extension of said frame, a first rotatable pulley supported by the housing and a second rotatable pulley upon a portion of said frame beneath said baseplate, a flexible driving connection between said pulleys, a non-attached driving connection between said second pulley and said cutter disc to cause rotation of said pulleys when the cutter disc is rotated by said prime mover, and at least one lawn edge trimming blade rotatable about the axis of a shaft driven by said first pulley.

The invention will be described in more detail with reference to the accompanying drawings, in which:

FIG. 1 shows in perspective and part section the lawn trimmer accessory of this invention, the baseplate of a lawnmower to which the accessory is to be fitted is shown in broken outline; and FIG. 2 is a fragmentary sectional view of a detail of the accessory.

In accordance with a preferred embodiment as shown in the drawings, the appliance consists of a U-shaped metal frame 1 of elongated form provided at opposite ends 2 and 3 with pivoted clips 4 and 5. The appliance is intended as an accessory for a rotary lawnmower (not shown) which conventionally comprises a prime mover in the form of a petrol engine mounted upon a baseplate 6 and having a driving shaft secured to rotate a cutter disc 7 carrying pivoted cutting blades 8. The baseplate 6 has a cylindrical skirt 9 enclosing the cutting circle of the blades 8.

Each clip 4 or 5 comprises a plate 11 secured to a pivot pin 10 supported between like brackets 12 secured by bolts 13 to the opposite upright flanges 14 of the U-shaped frame 1. The bolts 13 are positioned in slots 14 for longitudinal spacing adjustment on the frame 1. Each bracket 12 is provided with a stepped portion 15 which on the two brackets 12 confront each other from the opposite ends of the frame 1. A pair of spring biased lugs 16 extend outwardly from opposite sides of each bracket 12 in the manner of wings and in rotation of the bracket 12 to an upright position they are deflected over a curved lead-on portion 17 of each bracket 12 to snap into engagement with the stepped portion 15. As shown in the drawings the baseplate 6 of a lawnmower is positioned over the frame 1 to be supported between the stepped portions 15 of each pair of brackets 12. Positive connection between the frame 1 and the baseplate 6 is necessary and in achieving this only a small modificaton is initially required in the baseplate 6. A pair of holes at diametrally opposite sides and in the skirt 9 of the baseplate 6 need to be drilled. When the plate 11 of clip 5 is swung upright holes 18 serve as a drilling jig. After drilling of holes 20 in the baseplate 6 it is rotated 180° and lock pins 19 on clip 4 are engaged in the drilled holes while further holes 20 are drilled using clip 5 as a jig. Additional lock pins 19 are then inserted in holes 18 and the baseplate 6 securely locked to the frame 1.

The frame 1 therefore extends across the diameter of the baseplate 6 and has a media portion underlying the drive shaft of the prime mover (not shown) which is mounted upon the lawnmower baseplate 6. The depth of the U-shaped frame 1 is such as to permit entry of the frame 1 beneath the baseplate 6 at least when the lawnmower height adjustment is at its maximum setting and the height of the stepped portion 15 on each bracket 12 ensures clearance between the frame 1 and the lawnmower cutting blades 8. A pulley 21 is supported in bearings within the frame 1 at its medial position and is provided with a pair of upstanding drive posts 22 carrying cushioning sleeves 23.

The lawnmower will require a further minor modification initially to permit driving engagement between its drive shaft and the pulley 21 on frame 1. This modification entails the replacement of the fixing nut for the cutter disc 7 on the end of the drive shaft by a driving collar 24 being a rectangular metal block having a threaded medial bore. The collar 24 is of such a length as to be accommodated within the diameter of the conventional truncated apex of the cutter disc 7. Thus, when the frame 1 is secured beneath the baseplate 6 the posts 22 on the pulley 21 will be disposed to opposite sides of the driving collar 24. When the prime mover is activated the collar 24 will be rotated with the cutter disc 7 to abut the drive posts 22 and thereby rotate the first pulley 23. The collar 24 need not be removed for the remainder of the life of the lawnmower or its cutter disc 7. The collar 24 has a pair of spaced location holes 25 to accommodate the ends of the driving posts 22 and do so only during drilling of holes 20 in the baseplate skirt 9 for accurate location of the frame 1 with respect to the baseplate 6.

An upright rectangular housing 26 is provided on a longitudinal extension of the frame 1 and a pulley 27 in the housing 26 is rotatably supported within bearings upon a shaft 28. The pulley 27 may have a double track of which only the outer one 27A is shown. A flexible drive belt 29 interconnects the pulley 21 with the inner track (not shown) of pulley 27 over idler pulleys 30 also within the housing 26.

An upright cutting blade housing 31 is connected by articulated arms 32A and 32B to one side 33 of the housing 26 and on the arm 32A a pivot pin 34 pivotally secures the housing 31 thereto to permit inclination thereof from the vertical at the will of the operator. An abutment pad 34A is provided on the outer end of the pin 34 to be engaged by an enlarged domed head 35 on a spindle 36 slidable through the side 33 of the housing 26. A helical compression spring 37 urges the head 35 outwardly to a limit restrained by a nut (not shown) on the inner end of the spindle 36. A control arm 38 is connected by bowden cable 39 to a hand lever 40 conveniently located on the handle-bar 41 of the lawnmower, and when pulled by said cable 39 lowers the cutting blade housing 31 by compressing the spring 37 through abutment of the pad 34A with the head 35 of the spindle 36.

The housing 31 comprises an enclosing casing 42, open at the bottom, rotatably mounting a shaft 43 passing through a side wall 42A thereof and to opposite ends of which are affixed a pulley 44 confronting the outer track 27A of pulley 27 of the housing 26, and an internal cutter bar 45. An opposite side wall 42B may be in the form of a safety screen. It will be appreciated that this cutter rotates in a vertical plane and is completely concealed except at the lower end of its arc where it protrudes from the open bottom of the casing 42. A coupling belt 46 interconnects the pulleys 27 and 44 for drive of the edge trimming cutter 45. It will be appreciated that without operator control the cutting blade housing 31 will be elevated by the action of the spring 37 to an inoperative position so that the depth of cut is at all times directly controlled by the force applied by the operator to the hand lever 40. In all positions of operating adjustment of the height of the housing 31 the articulated arms 32A and 32B ensure proper tensioning of the belt 46. A carrying handle 47 is provided at the top of the housing 26 where reasonable balance for transport is available. It will also be noted that in a condition of attachment to the lawnmower the operator is well protected from operating parts of the appliance.

Better balance and manipulative control of the edge cutting function provided by the trimming device is obtained when the frame 1 is attached to the lawnmower baseplate 6 so that the cutting blade housing 31 is generally aligned with the axis of the rear wheels of the lawnmower. That is this housing 31 trails the frame 1 during normal forward movement of the lawnmower.

Whereas a preferred embodiment has been described in the foregoing passages it should be understood that other forms and embodiments are possible within the scope of this invention.

What I claim is:

1. A lawn edge trimming appliance in the form of an accessory for a rotary lawnmower which includes a prime mover upon a baseplate surrounding and covering a cutter disc which mounts a plurality of cutting blades and is rotated by a drive shaft from the prime mover, said appliance comprising an elongated frame, means for fixing said frame to opposite parts of the periphery of said baseplate so that said frame is disposed on the diameter thereof, an upright housing upon an extension of said frame, a first rotatable pulley supported by the housing and a second rotatable pulley upon a portion of said frame beneath said baseplate, a driving connection between said pulleys, a driving connection between said second pulley and said cutter disc to cause rotation of said pulleys when the cutter disc is rotated by said prime mover, and at least one lawn edge trimming blade rotatable about the axis of a shaft driven by said first pulley.

2. A lawn edge trimming appliance as claimed in claim 1, wherein said driving connection is non-attached and includes firstly a driving collar fixed with respect to said cutter disc and rotatable therewith and secondly at least one abutment on said second pulley engageable by said collar when rotating to cause rotation of said second pulley.

3. A lawn edge trimming appliance as claimed in claim 2, wherein the driving collar has projecting arms and said second pulley carries two spaced abutments in the form of upright posts, and the driving collar is secured to the lower end of the lawnmower drive shaft at a level whereby its arms extend to either side and between said posts.

4. A lawn edge trimming appliance as claimed in claim 1, wherein said fixing means for the frame comprises adjustable brackets near opposite ends of the elongated frame pivotally mounting clips for attachment to the lawnmower baseplate.

5. A lawn edge trimming appliance as claimed in claim 4, wherein said clips mount one or more locking pins each engageable within a hole in said baseplate when the respective bracket is moved to one of its pivoted positions, and a catch is provided to retain said bracket in that one of its pivoted positions.

6. A lawn edge trimming appliance as claimed in claim 4, wherein said brackets include steps for seating under a peripheral edge of the lawnmower baseplate to facilitate spacing of said frame beneath said baseplate for clearance from the cutter disc and cutting blades of the lawnmower.

7. A lawn edge trimming appliance as claimed in claim 1, wherein said driving connection between said second pulley and said first pulley is a flexible belt reeved over a pair of idler pulleys between the first and second pulleys.

8. A lawn edge trimming appliance as claimed in claim 1, comprising also a canopy enclosing said trimming blade and having an open bottom through which said blade protrudes, said canopy being pivoted to one side of said housing for displacement along a substantially upright axis, whereby said trimming blade when rotated operates in a cutting circle substantially vertical and tangential to the lawnmower baseplate.

9. A lawn edge trimming appliance as claimed in claim 8, wherein a compression spring between said housing and said canopy urges the latter to an elevated position removed from an operating position, and an operator controlled cable is attached to said canopy to draw said canopy down to said operating position against tension in said spring.

10. A lawn edge trimming appliance as claimed in claim 8, wherein the drive from said first pulley to said trimming blade shaft is via flexible belt, and wherein pivoting of said canopy to said housing is effected by articulated arms to one of which said canopy is pivoted to permit lateral tilting of said cutting circle from vertical alignment.

11. A rotary lawnmower accessory for the trimming of lawn edges and comprising a mounting frame of elongated form spaced clip means on said frame for clipping to opposite parts of the lawnmower baseplate for the support of said frame beneath said baseplate and diametrally disposed thereto, a first pulley on the frame and centrally beneath said baseplate and having abutment means engageable with the lawnmower's driving rotation of said pulley, an overhead housing on one end of said frame, a second pulley in said housing rotated by said first pulley via a belt, an edge trimmer assembly pivoted to one side of said housing and urged by spring means to an elevated pivoted position, said edge trimmer assembly including a cutting blade belt driven from said second pulley to rotate in a substantially vertical plane, and manual control means connected to said assembly to pivot same against the action of said spring means to a lowered pivoted position for effective trimming operation.

* * * * *